FIG. 1, FIG. 1-A

Dec. 18, 1962 H. P. WOLFF 3,069,629

CARRIER-LOGIC CIRCUITS EMPLOYING MICROWAVE TRANSMISSION LINES WITH SELECTIVE IMPEDANCE SWITCHING ON MAIN LINES OR ON STUBS

Filed May 29, 1959 9 Sheets-Sheet 2

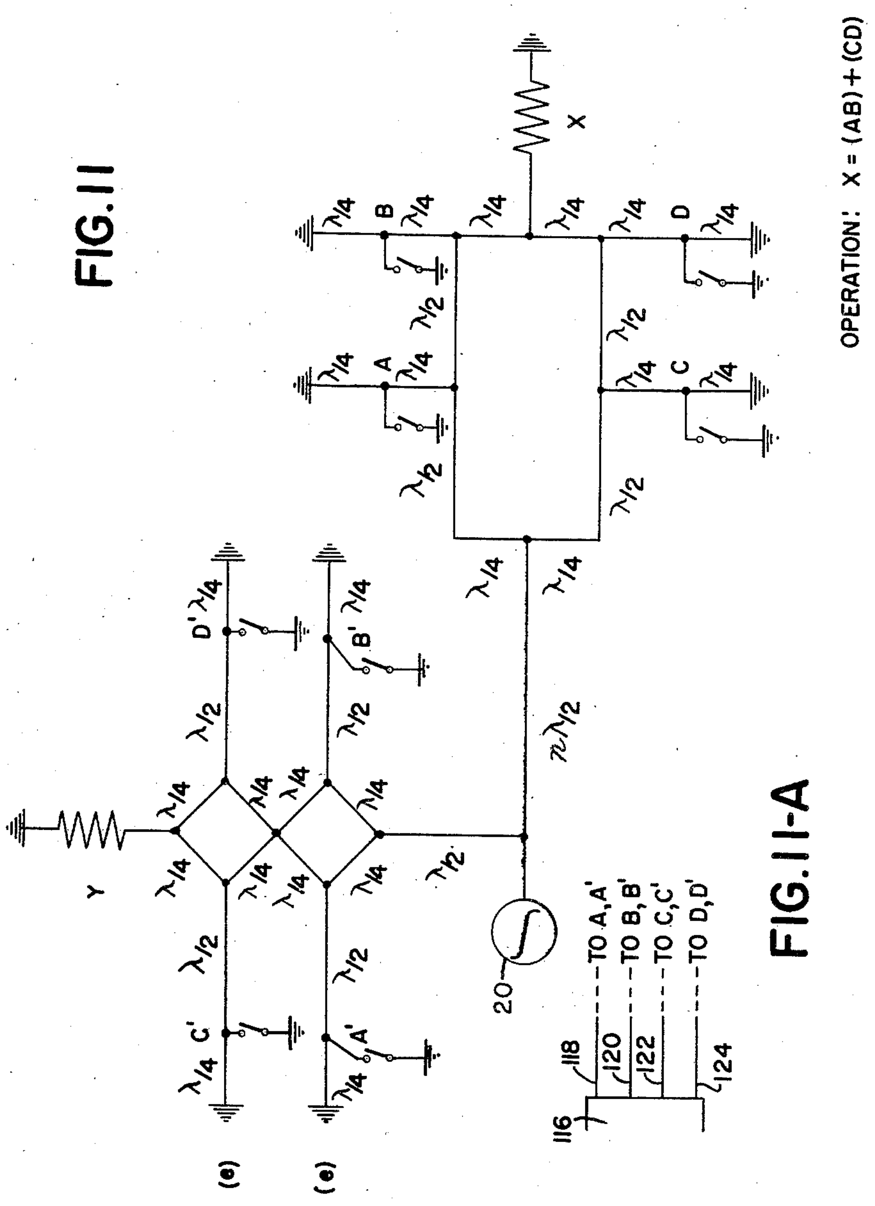
FIG. 11, FIG. 11-A

TWO EQUIVALENT
CIRCUITS
PERFORMING
THE OPERATION
X=(A+B)·(C+D)

Dec. 18, 1962 H. P. WOLFF 3,069,629

CARRIER-LOGIC CIRCUITS EMPLOYING MICROWAVE TRANSMISSION LINES WITH SELECTIVE IMPEDANCE SWITCHING ON MAIN LINES OR ON STUBS

Filed May 29, 1959 9 Sheets-Sheet 8

Dec. 18, 1962 H. P. WOLFF 3,069,629

CARRIER-LOGIC CIRCUITS EMPLOYING MICROWAVE TRANSMISSION LINES WITH SELECTIVE IMPEDANCE SWITCHING ON MAIN LINES OR ON STUBS

Filed May 29, 1959 9 Sheets-Sheet 9

X=AB 3,069,629

CARRIER-LOGIC CIRCUITS EMPLOYING MICROWAVE TRANSMISSION LINES WITH SELECTIVE IMPEDANCE SWITCHING ON MAIN LINES OR ON STUBS

Hermann P. Wolff, Red Oaks Mill, N.Y., assignor to International Business Machines Corporation, New York, N.Y., a corporation of New York Filed May 29, 1959, Ser. No. 816,884
17 Claims. (Cl. 328—92)

This invention relates to apparatus for information handling, and more particularly to the performance of logical operations, for example, in computing and data processing.

An object of the invention is to perform logical operations at high speed.

In accordance with the invention in certain embodiments, items of information are represented by signal pulses of electromagnetic waves or currents which are employed to control switching devices associated with electromagnetic transmission lines or the like. By means of quarter wavelength and half wavelength spacings on a transmission line, the switching devices serve to change the effective impedance condition associated with the line not only at the location of the device but also at certain other points in the transmission system, by a variety of remote control, thereby controlling the transmission of waves from a power source to a receiving device. By controlling one or more switching devices in accordance with a first item of information, which may be referred to as item A, and controlling one or more additional switching devices in accordance with a second item of information, B, the transmission of power from the source to the receiving device may be controlled so as to produce at the receiving device an indication of the result of performing a given logical operation involving a combination of items A and B. In more complex logical operations, two or more receiving devices may be employed to receive simultaneously the results of two or more logical operations involving any number of items. In one embodiment, the logical operation may involve a single item A, for example, to indicate either the presence or the absence of A.

Certain particular switching devices (sometimes referred to in this description as switches) will be described herein, which in combination with the other components of the system, provide extremely rapid logical operations.

The operation of a switching device to produce a short circuit across a transmission line may, for example, be used to represent the application of a binary digit "one" as an item of input into the system. The short circuit at the location of the switch results in a short-circuit condition at a point one half wavelength distant along the line, while at a point one quarter wavelength from the location of the switch the effect is that of an open circuit or substantially infinite impedance across the line.

It will be understood from the theory of transmission lines that a short circuit across the line at a given point results in open-circuit conditions at distances of odd numbers of quarter wavelengths from the short circuit and also results in conditions of additional short circuits at distances that are even numbers of quarter wavelengths, i.e., integral numbers of half wavelengths from the location of the short circuit.

A switching device that is not producing a short circuit may constitute substantially an open circuit across the line and may be used to represent the application of a binary "zero" as an item of input into the system.

The condition wherein the wave source is permitted to transmit power to the receiving circuit may be taken to represent an output of a binary "one" as the result of the logical operation for which the circuit is designed. On the other hand, the condition wherein the wave source is prevented from transmitting appreciable power to the receiving circuit may be taken to represent an output binary "zero" as a result. The choice of representations both as to inputs and outputs may be varied as desired to suit the exigencies of any operating situation.

A feature of the system is the provision of an impedance matching dummy load device together with a sufficient number of extra switches beyond the minimum number of switches required to perform the given logical operation, in order that the wave source may be connected to a matching or equivalent load regardless of whether the result of the logical operation is a "one" or a "zero," and regardless of the information content of the items of information to be combined. It will be noted that transmission of power from the source to the dummy load may also be regarded as representing the result of a logical operation involving a combination of items A and B, so that, in general, a plurality of receiving devices may be provided, any or all of which may be used to indicate useful results. In general, the dummy load may be regarded as receiving the result of a logical operation which is logically complementary to the logical operation for which the given system is designed.

Another feature is that no switches need be placed directly in line between the wave source and a receiving device; instead, any or all switches may be placed a suitable number of quarter wavelengths distance from the point where control is to be exercised.

Another feature is the use of reflectively terminated stub lines in conjunction with switching means. Open circuit or short circuit terminations are particularly adapted for use as reflective terminations.

There are certain advantages in employing microwaves in the system, including that of high speeds of operation. Moreover, one or more quarter wavelengths or half wavelengths may be accommodated within convenient physical limits.

Frequencies of the order of a kilomegacycle per second or higher are examples of frequencies suitable for use in systems operating in accordance with the invention. These waves propagate at substantially the speed of light. Furthermore, for the operation of switches at very high speeds, a very wide bandwidth is required in the transmission system. The necessary width of band is readily obtainable in systems operating at these high frequencies. such frequencies will be referred to herein generally as "microwave frequencies" and the term "microwaves" will be applied generally to waves of such frequency.

The invention as embodied in systems operating at microwave frequencies may utilize component parts such, for example, as the following: The switching devices, in some embodiments, may be gas discharge tubes. Diodes, for example, semiconductor diodes, may be employed in certain embodiments as the switching devices. The transmission lines may be coaxial lines or they may be of the type known as striplines. Alternatively, waveguides may be used. For wave sources, magnetrons, velocity variation oscillators, travelling wave tubes, parametric or other oscillators may be used. The switching devices may be controlled by means of microwaves, if desired, so that the input wapes, the output waves, and the waves employed within the logic system may all be microwaves, and may, in some embodiments, all be of one frequency.

Among the illustrative embodiments of the invention which are shown herein are a binary half adder and examples of other logical operations, but it should be understood that the invention is not, in its broadest aspect, limited to the systems illustrated.

Other objects, features and advantages will appear from the following more detailed description of illustrative embodiments of the invention, which will now be given in conjunction with the accompanying drawings.

In the drawings,

FIG. 1A is a schematic diagram of a source of input signals for the system of FIG. 1;

FIGS. 11 through 15 are schematic circuit diagrams of embodiments of the invention for performing complex logical operations other than binary addition;

FIG. 11A is a schematic diagram of a source of input signals for the system of FIG. 11;

Figure 1:
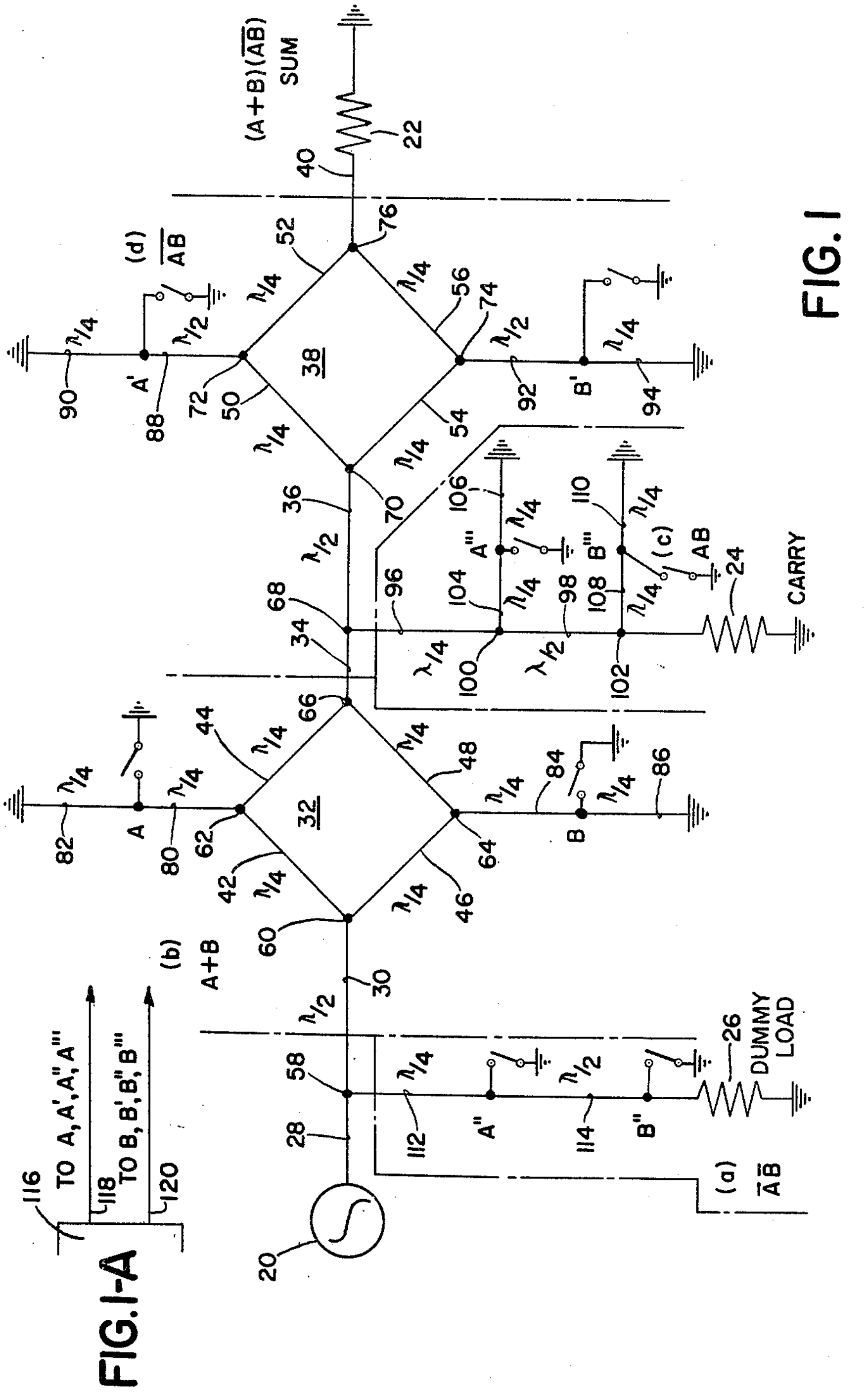
FIG. 1 is a schematic circuit diagram of an embodiment of the invention in a binary half adder.

In FIG. 1, there is shown schematically the circuit of a binary half adder including a source 20 of electromagnetic waves, a first receiving device 22, represented symbolically as a resistor, for receiving an output wave representative of a binary sum, a second receiving device 24, for receiving an output wave representative of a carry digit, and a third device 26 for presenting a matching load impedance to the source 20 when neither of the devices 22 and 24 is connected to the source.

The source 20 is connected to the receiving device 22 through a plurality of lengths of transmission line arranged in tandem relationship, and two loops, rings, or parallel paths of transmission line. These lines include a line 28 of arbitrary length, a half wavelength line 30, a first ring 32 of quarter wavelength lines, a line 34 of arbitrary length, a half wavelength line 36, a second ring 38, and a line 40 of arbitrary length. The ring 32 comprises four quarter wavelength lines 42, 44, 46 and 48 and the ring 38 comprises four quarter wavelength lines 50, 52, 54 and 56. The several lines are joined at junction points as shown in the figure, the reference numerals for these junction points being identified below in Table 1:

*Table 1*

| Junction point | Between line or lines— | and line or lines— |
|---|---|---|
| 58 | 28 | 30. |
| 60 | 30 | 42 and 46 in parallel. |
| 62 | 42 | 44. |
| 64 | 46 | 48. |
| 66 | 44 and 48 in parallel | 34. |
| 68 | 34 | 36. |
| 70 | 36 | 50 and 54 in parallel. |
| 72 | 50 | 52. |
| 74 | 54 | 56. |
| 76 | 52 and 56 in parallel | 40. |

A half wavelength line is connected to the junction point 62, this line comprising quarter wavelength lines 80 and 82 in tandem, with a switching device A connected across the junction of the lines 80 and 82.

A half wavelength line is connected to the junction point 64, this line comprising quarter wavelength lines 84 and 86 in tandem, with a switching device B connected across the junction of the lines 84 and 86.

A pair of three-quarter wavelength lines are connected to the junction points 72 and 74, respectively, as shown. The line connected to the junction point 72 comprises a half wavelength line 88 and a quarter wavelength line 90 in tandem, with a switching device A′ connected across the junction of the lines 88 and 90. The line connected to the junction point 74 comprises a half wavelength line 92 and a quarter wavelength line 94 in tandem, with a switching device B′ connected across the junction of the lines 92 and 94.

The receiving device 24 is connected to the junction point 68 through a tandem combination of a quarter wavelength line 96 and a half wavelength line 98, the junction point of the lines 96 and 98 being designated 100 and the junction point of the line 98 and the receiving device 24 being designated 102. A pair of half wavelength lines are connected to the junction points 100 and 102, respectively. The line connected to the junction point 100 comprises quarter wavelength lines 104 and 106 in tandem, with a switching device A‴ connected across the junction of the lines 104 and 106. The line connected to the junction point 102 comprises quarter wavelength lines 108 and 110 in tandem, with a switching device B‴ connected across the junction of the lines 108 and 110.

The device 26, which may be termed a dummy load, is connected to the junction point 58 through a tandem combination of a quarter wavelength line 112 and a half wavelength line 114. A switching device A″ is connected across the junction of the lines 112 and 114, and a switching device B″ is connected across the junction of the line 114 and the load 26.

Wave reflecting terminations, in this case short circuits, indicated symbolically by grounds, are provided at the remote ends of the lines 82, 86, 90, 94, 106 and 110. The grounds shown at the remote ends of the devices 22, 24 and 26 indicate that the device is connected across the line in the conventional manner, one side of the line usually being grounded.

The operation of the system of FIG. 1 may be explained with reference to the table of binary addition, which is given in Table 2 below.

*Table 2*

| | |
|---|---|
| Case I. | Zero plus Zero is Zero, with Zero Carry |
| Case II. | Zero plus One / or / One plus Zero } is One, with Zero Carry |
| Case III. | One plus One is Zero, with One to Carry |

In Case I of Table 2, all of the switches A, A′, A″, A‴, B, B′, B″ and B‴ are placed in the open-circuit condition. The open circuits at A″ and B″ interpose substantially no hindrance to free transmission of waves from the junction 58 to the dummy load 26 over the line segments 112 and 114 in tandem. The open circuit at A causes the line segments 80 and 82 in tandem to constitute a half wavelength segment connected across the junction 62. This half wavelength segment is short-circuited at the end remote from the junction 62 and so acts as a short circuit across the junction 62. The open circuit at B causes the line segments 84 and 86 in tandem to constitute a half wavelength segment connected across the junction 64. This half wavelength segment is short-circuited at the end remote from the junction 64 and so acts as a short circuit across the junction 64. The short circuit at the junction 62 appears as an open circuit at the junction 60 which is a quarter wavelength away from the junction 62. The short circuit at the junction 64 likewise appears as an open circuit at the junction 60 which is a quarter wavelength away from the junction 64. The open circuit at the junction 60 appears as an open circuit at the junction 58 which is a half wavelength away from the junction 60. The open circuit at the junction 58 interposes substantially no hindrance to free transmission from the source 20 through the line segment 28 and the junction 58 to the line segment 112 and thence through the line segment 114 to the dummy load 26. At the same time, the short-circuited conditions at the junctions 62 and 64 prevent any material transmission of waves beyond those junctions. The net result is that the source 20 is connected to the impedance matching dummy load 26 and there is no transmission of waves from the source 20 to either the device 22 or the device 24. The absence of waves in the device 24 indicates a Zero binary carry. Since substantially no waves are transmitted from the source 20 beyond the junctions 62 and 64, the conditions of the switches A′, B′, A‴ and B‴ have no effect upon the net result.

In Case II of Table 2, either the switches A, A′, A″ and A‴ are in the open-circuit condition and the switches B, B′, B″ and B‴ are in the short-circuit condition, or, A, A′, A″ and A‴ are in the short-circuit condition and B, B′, B″ and B‴ are in the open-circuit condition. Since there is a short circuit across the line either at A″ or at B″, there is no material transmission from source 20 to the dummy load 26. Furthermore, there is an open-circuit condition across the main transmission line at the junction 58 since this junction is a quarter wavelength away from a short-circuit condition in case the short circuit is at A″ or else the junction 58 is three quarter wavelengths away from a short-circuit condition in case the short circuit is at B″. Since there is a short circuit either at A or at B, there is an open-circuit condition either at junction 62 or at junction 64. Consequently, there is free transmission of waves on one side or the other of the ring 32. It will be noted that when there is an open-circuit condition at junction 62 due to a short-circuit condition at A, there is at the same time an open-circuit condition at B which causes a short-circuit condition at junction 64. If, on the other hand, there is an open-circuit condition at junction 64 due to a short-circuit condition at B, there is at the same time an open-circuit condition at A, which causes a short-circuit condition at junction 62. When there is a short-circuit condition at junction 64, an open-circuit condition is produced at junction 60 and also at junction 66. Thus, there is a free transmission path from the source 20 through the line segments 28, 30, 42, 44 and 34 at least as far as the junction 68. Similarly, when there is a short circuit at junction 62, an open-circuit condition is produced at junction 60 and also at junction 66. Thus, there is a free transmission path from the source 20 through the line segments 28, 30, 46, 48 and 34 at least as far as the junction 68.

If A′ is a short circuit, a short-circuit condition appears at junction 72, which in turn produces open-circuit conditions at junctions 70 and 76. At the same time, B′ being an open circuit, an open-circuit condition appears at junction 74. A free transmission path is accordingly extended from junction 68 through the line segments 36, 54, 56 and 40 to the receiving device 22, provided there is no short circuit produced at the junction 68. Since A‴ is a short circuit, an open-circuit condition appears at junction 100, but since B‴ is an open circuit, a short-circuit condition appears at junction 102. The short-circuit condition at junction 102, being three quarters of a wavelength away from junction 68, produces an open-circuit condition at junction 68. Accordingly, free transmission is established all the way from the source 20 into the receiving device 22, indicating a sum of One. The short-circuit condition at junction 102 prevents any material transmission of waves from the source 20 into the receiving device 24, thereby indicating a Zero carry.

If, on the other hand, B′ is a short circuit, a short-circuit condition appears at junction 74, which in turn produces open-circuit conditions at junctions 70 and 76.

Then, A′ being an open circuit, an open-circuit condition appears at junction 72. A free transmission path is accordingly extended from junction 68 through the line segments 36, 50, 52 and 40 to the receiving device 22, provided there is no short circuit produced at the junction 68. Since B‴ is a short circuit, an open-circuit condition appears at junction 102, but since A‴ is an open circuit, a short circuit condition appears at junction 100. The short-circuit condition at junction 100, being a quarter wavelength away from junction 68, produces an open-circuit condition at junction 68. Accordingly, free transmission is established all the way from the source 20 into the receiving device 22, indicating a sum of One. The short-circuit condition at junction 100 prevents any material transmission of waves from the source 20 into the receiving device 24, thereby indicating a Zero carry.

In Case III, all the switches are in the short-circuit condition. Switch A″ has the effect of producing an open circuit across the line at junction 58. The short-circuit condition at switch A″ prevents any material transmission of waves from source 20 to the dummy load 26. The open-circuit condition at junction 58 permits free transmission of waves through this junction. Switch A has the effect of producing an open circuit across the line at junction 62. Switch B has the effect of producing an open circuit across the line at the junction 64. Because of the open-circuit conditions at junctions 62 and 64, free transmission of waves is extended through junctions 60 and 62 to junction 66 and also through junctions 60 and 64 to junction 66 in parallel transmission paths. Switch A‴ has the effect of producing an open circuit at junction 100. Switch B‴ has the effect of producing an open circuit across the line at junction 102. Because of the open-circuit conditions at junctions 100 and 102, a path for free transmission of waves from source 20 is established all the way to the receiving device 24, thereby indicating a Carry of One. Switch A′ has the effect of producing a short circuit across the line at the junction 72. Switch B′ has the effect of producing a short circuit across the line at the junction 74. The short circuits at the junctions 72 and 74 prevent any material transmission of waves from the source 20 to the receiving device 22, thereby indicating a binary Sum of Zero. The short circuits at the junctions 72 and 74 also produce an open-circuit condition at the junctions 68 and 70 so that the line segment 36 has no material shunting effect upon the line between the source 20 and the receiving device 24.

The switches may be operated by means of pulses, either direct current or amplitude modulated carrier, from any suitable data source 116 (FIG. 1A) over parallel paths, for example, a path 118 connected to the operating terminals of the switches A, A′, A″ and A‴, and a path 120 connected to the operating terminals of the switches B, B′, B″ and B‴. The source 116 may, for example, be a device for reading data from punched cards.

For reference purposes and for convenience in explaining later figures which show systems for performing a variety of logical operations of a compound nature, the system of FIG. 1 is divided into sections (*a*), (*b*), (*c*) and (*d*) by means of broken lines. It will be noted that section (*a*) transmits if and only if neither switch A″ nor switch B″ is closed. In logical section (*a*) performs the operation $\overline{A}\ \overline{B}$, namely, "neither A nor B".

Section (*b*) is an "or" circuit, so called because it transmits if and only if either switch A or switch B is closed. It will be noted that this is not an "exclusive or" circuit, in that it does not exclude the case wherein both A and B are closed.

Section (*c*) is an "and" circuit, so called because it transmits if and only if both A‴ and B‴ are closed.

Section (*d*) is a circuit which is complementary in effect to an "and" circuit, in that section (*d*) transmits whenever A′ and B′ are not both closed.

Since all the switches A, A′, A″ and A‴ are assumed to be made to close if and only if a signal is present on wire 118 from data source 116, and since all the switches B, B′, B″ and B‴ are assumed to be made to close if and only if a signal is present on wire 120, it will be convenient to say that a circuit transmits energy if and only if a certain combination of signals is present on these wires and to characterize these signals as signals on A or B as the case may be, the term "a signal on A" or simply "the presence of A" meaning that there is present on wire 118 a signal of suitable nature to cause the closing of the switches controlled by wire 118, and the term "a signal on B" or simply "the presence of B" meaning that there is present on wire 120 a signal of suitable nature to cause the closing of the switches controlled by wire 120.

In terms of sections (*a*), (*b*), (*c*) and (*d*), then, the operation of the system of FIG. 1 may be described as follows: At junction 58, energy from the source 20 is diverted into section (*a*) if and only if signals from neither A nor B are present. That is, section (*a*) eliminates the case in which signals from neither A nor B are present. Section (*b*) transmits energy in all other cases, namely, when signals from either A or B or both are present. Section (*c*) diverts energy to the Carry output when signals from both A and B are present. Section (*d*) transmits energy to the Sum output when signals from either A or B, but not both, are present.

Figure 2:
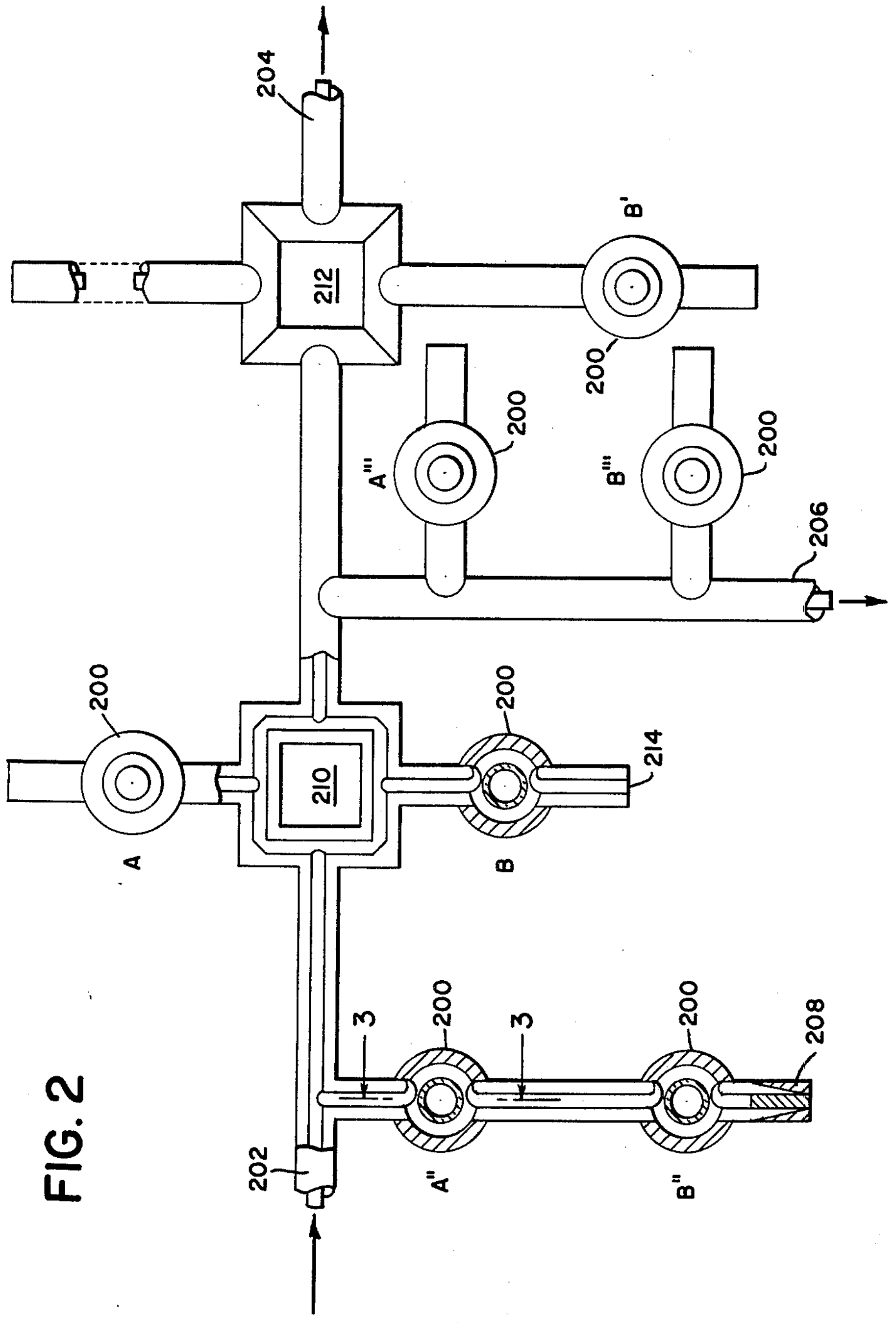
FIG. 2 is a schematic diagram of an implementation of a binary half adder utilizing coaxial transmission lines together with gas discharge devices as switching means.

FIG. 2 shows an embodiment of the system of FIG. 1 in transmission lines of the coaxial type. In this and other embodiments, the switches may comprise, for instance, spark gaps, gas-discharge tubes or diodes.

In the case of spark gaps and gas-discharge tubes there are two critical levels of impressed electromotive force. The higher of these levels is one such that when this level is exceeded the device discharges, ionizes or breaks down, forming a highly conductive electrical path between electrodes of the device. There is a lower critical level such that if the impressed electromotive force falls below this level deionization occurs and the discharge ceases. As used herein, when there is a signal present, an electromotive force is impressed upon the switch of a level exceeding the critical level for initiating a discharge. The energy received at the switch from the source 20 is assumed to be of a low level such that the electromotive force which it impresses upon the switch is below the level at which the switch will cease to discharge and, of course, well below the level which will initiate a discharge. Thus, when a signal is applied to a gas-discharge type switch, a discharge will be initiated. The discharge will continue until the signal falls below the lower critical level, at which time the discharge will cease. During the duration of the discharge, the switch acts substantially like a short circuit across the line at the point of location of the switch, i.e., in a plane transverse to the line and passing through the electrodes of the switching device. As pointed out in connection with the description of FIG. 1, a short circuit across the line at the location of the switch produces a short circuit effect across the line at points located at half wavelength intervals of distance from the switch. The short circuit at the switch also produces an open circuit effect at points located an odd number of quarter wavelengths from the switch.

The gas discharge device may comprise a glass envelope containing a filling of one or more gases such as hydrogen, neon, mercury vapor or others, at a pressure of say 10 mm. of mercury, to provide a plentiful supply of electrons. To this may be added water vapor at the same pressure, to promote the re-absorption of electrons when the ionizing potential is removed. The tube contains two principal electrodes between which the main discharge takes place. The tube is preferably mounted within a resonant conductive cavity with the electrodes in contact with opposing inner conductive surfaces of the structure. In one embodiment the electrodes are insulated from each other in order that a biasing potential may be maintained between them, while at the same time surfaces of the conductive structure function as a single equipotential surface for waves at the frequency for which the cavity is resonant. The biasing potential is preferably slightly below the lower critical level of the device. The bias maintains a relatively low degree of ionization within the tube which does not sustain a discharge but which facilitates the starting of the discharge when the upper critical level is thereafter exceeded. In another embodiment, a third electrode known as a "keep-alive" electrode is introduced in the neighborhood of one of the principal electrodes, for maintaining the desired initial low degree of ionization in this neighborhood to facilitate the starting of the main discharge. Alternatively, the bias potential or the keep-alive potential may be made intermediate between the upper and lower critical levels. In this case, when a discharge has been started in the tube, the signal which initiated the discharge may be removed and the tube will remain locked in the discharging state, due to the presence of the biasing or keep-alive potential. Then, in order to make the discharge stop, it is necessary either to remove the keep-alive potential temporarily or to apply an opposing potential to offset the keep-alive potential.

When a diode, e.g., a semiconductor diode, is used as a switch, no keep-alive potential is required. The diode either presents a highly conductive path to the waves from the source 20, as when an external signal is impressed upon the diode, or, with no external signal input or with a biasing potential applied in the backward direction, the diode presents a high impedance across the line.

In the case of either a discharge device or a diode, the impressed signal input for activating the switching action is assumed to be relatively strong in its effect upon the switch compared to the effect of the waves from the source 20.

In FIG. 2, a plurality of gas discharge tubes 200 are shown which serve as switches in a network of coaxial lines which are arranged to form a binary half adder of the same configuration as that shown schematically in FIG. 1. Electromagnetic waves are impressed upon the coaxial line 202 as from the source 20 of FIG. 1. An output of electromagnetic waves representative of the binary sum is obtained from the coaxial line 204. An output representative of the carry digit is obtained from the coaxial line 206. The dummy load 26 of FIG. 1 is provided in the form of a resistive termination 208 of conventional form comprising in general a resistive coating on one or both of the conductors of the coaxial line or a tapered body of resistive material upon one or the other conductor. In a wave guide embodiment, a carbonized piece of insulating material may be inserted in the waveguide to provide a resistive termination. The lengths of the various component coaxial line segments are adjusted so that the various critical points (junctions, switch locations, and wave-reflective terminations) are separated electrically by distances equivalent to quarter wavelengths or half wavelengths or multiples thereof as called for in the schematic representation, in this case as shown in FIG. 1. The loops or rings 32, 38, may be provided in the form of squares as shown at 210 and 212, respectively in FIG. 2. This form utilizes standard right angle corners or bends which are available in coaxial line form. Alternatively, the loop may take a diamond shaped form using standard "Y" branches, or other available forms may be used. Stub lines are connected to the main lines by means of T joints in coaxial line form. Short circuit terminations are provided where required, by a direct connection between the inner and outer conductors of the coaxial line, as shown, for example, at 214. As in the system of FIG. 1, switches A, A′, A″ and A‴ are controlled by potentials sent from the data source 116 over line 118 and switches B, B′, B″ and B‴ are controlled by potentials sent over line 120. (FIG. 1A).

Figures 3, 4, 9:
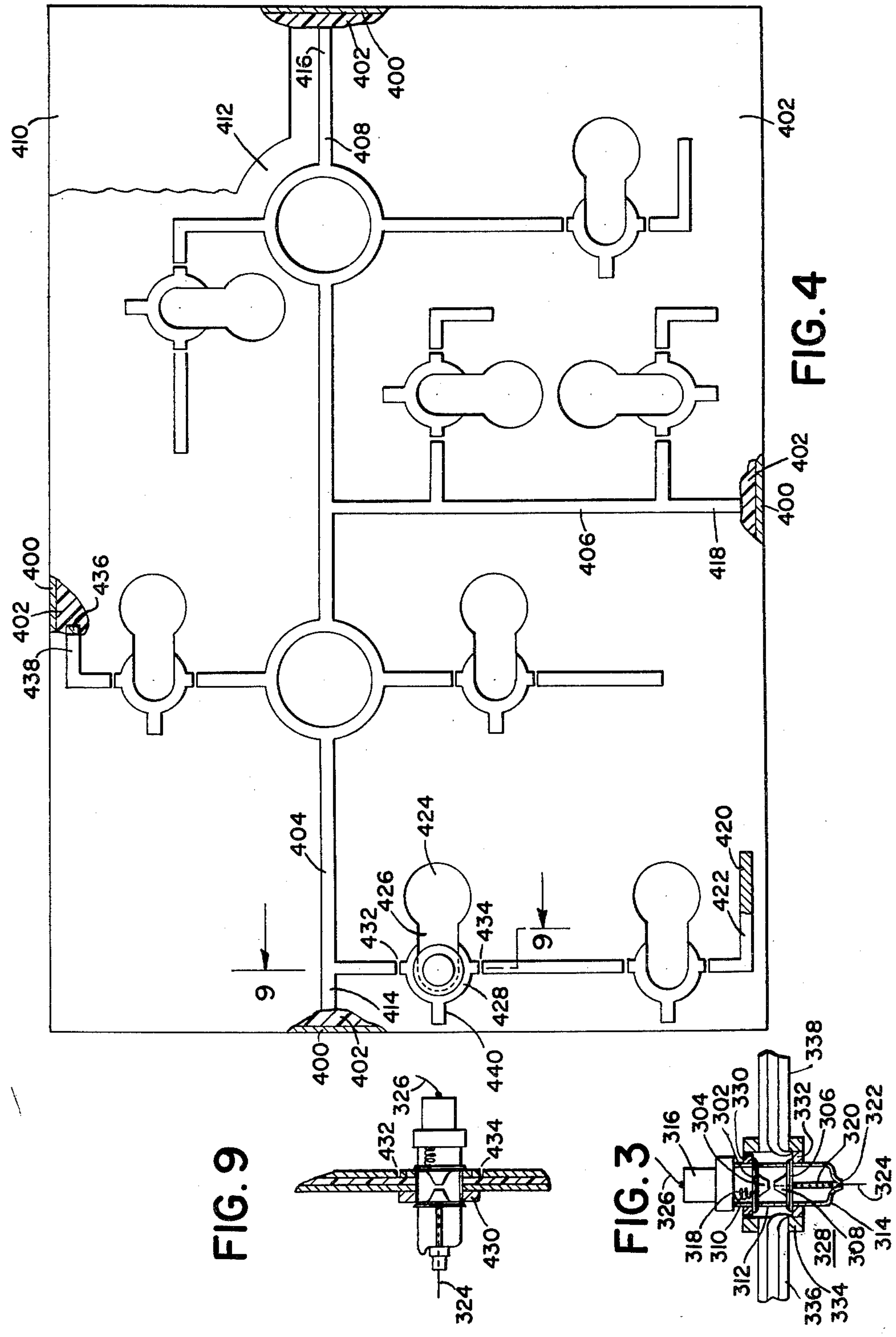
FIG. 3 is a sectional view of one of the gas discharge devices of FIG. 2, showing also the manner of connection of the gas discharge device to the coaxial transmission lines.
FIG. 4 is a schematic diagram of an implementation of a binary half adder utilizing electro-deposited or printed transmission lines, such as are known as striplines or microstrip, together with gas discharge devices as switching means.
FIG. 9 is a sectional view showing the manner of connection of a gas discharge device to a system of striplines.

FIG. 3 shows one of the gas discharge tube switching devices 200 in cross-sectional view. The gas discharge tube 200 comprises an upper disk 302 having a conical electrode 304 conductively attached thereto or integral therewith. There is provided a lower disk 306 with a conical electrode 308 arranged in opposing relation to the electrode 304. Glass envelope parts are sealed to the disks, part 310 being above the disk 302, part 312 between the disks, and part 314 below the disk 306. Electrical contact is made from the disk 302 and electrode 304 to a metal cap 316 by way of a contact spring 318 inside the envelope. A keep-alive electrode 320 may be provided and connected to a metal tip 322 to which may be connected a lead wire 324. A lead wire 326 may be connected to the cap 316 for connection in turn to one of the control wires 118 or 120.

The cavity resonator structure 328 is made in two halves which may be clamped together to surround the tube 200, the disk 302 being in electrical contact with the upper plate 330 of the resonator structure and the disk 306 being in electrical contact with the lower plate 332. The resonator has a cylindrical side wall 334 into which are inserted an input coaxial line 336 and an output coaxial line 338. In order to provide direct current isolation between the disks 302 and 306, the upper plate 330 is divided into two parts by a narrow circular slit which is filled with insulating material such as mica.

In the operation of the system of FIG. 2 with switches in the form shown in FIG. 3, a suitable keep-alive potential may be supplied to all of the switches in any suitable manner. For example, the wire 118 normally may impress a keep-alive potential upon the leads 326 of the switches A, A′, A″ and A‴ and the wire 120 may impress a similar potential upon the leads 326 of the switches B, B′, B″ and B‴. Alternatively, the keep-alive potential may be applied to the wires 324 of all the switches A, B, A′, B′, etc., from any suitable source. In either case, when a signal is received over the wire 118, an ionizing potential is applied to the leads 326 of the switches, A, A′, A″ A‴, causing these switches to set up a discharge between the electrodes 304 and 308, which constitutes a short circuit at these electrodes for electromagnetic waves transmitted to the resonator 328 over the coaxial line 336 and substantially preventing transmission of these waves into the coaxial line 338. Similarly, when a signal is received over the wire 120, an ionizing potential is applied to the leads 326 of the switches B, B′, B″ and B‴ with like effect upon the transmission of waves through these switches. When signals cease, the tube discharges also cease because the potential then drops to the keep-alive level. As in the system of FIG. 1, the signals received from the wires 118 and 120 (FIG. 1A) control the transmission of waves to the output lines 204 and 206 and to the dummy load 208 so that the system performs the functions of a binary half adder.

Figure 5:
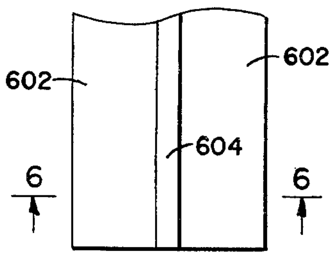
FIGS. 5 and 6 are a plan view and a sectional view, respectively, of a segment of microstrip.
Figure 6:
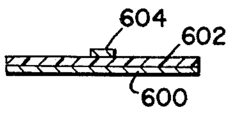

FIG. 4 shows an embodiment of the system of FIG. 1 in transmission lines of the form known as "strip line." One form of strip line is shown in top plan view in FIG. 5 and in cross-section in FIG. 6. A metal ground plate 600 is provided, to which is bonded a dielectric sheet 602. A metallic strip conductor 604 is bonded to the sheet 602 on the opposite side of the sheet from the plate 600. This form of line is known as "microstrip" and is analogous in operation to any system comprising a wire spaced apart from a ground plane.

Figure 7:
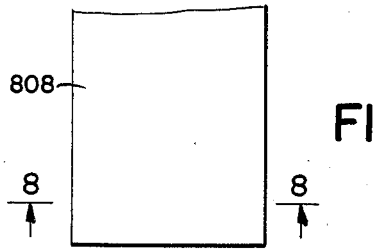
FIGS. 7 and 8 are a plan view and a sectional view, respectively, of another form of stripline.
Figure 8:
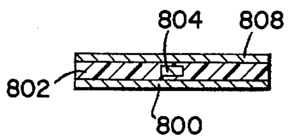

FIGS. 7 and 8 show another form of strip line, in which a dielectric sheet 802 of double thickness compared to sheet 602 is bonded top and bottom to ground plates 808 and 800 and there is provided a line conductor 804 embedded in the dielectric sheet mid-way between the ground plates. The arrangement is shown in top plan view in FIG. 7 and in cross-sectional view in FIG. 8.

In the embodiment shown in FIG. 4, a sufficiently large ground plate 400 is provided so that all the lines needed in the system shown schematically in FIG. 1 may be accommodated. The ground plate 400 is bonded to a dielectric sheet 402 which covers the entire ground plate. Lines such as 404, 406, 408, as required by the system schematic may be bonded to the upper surface of the sheet 402, as by methods used in making electro-deposited or so-called printed circuits. In one embodiment, the entire upper surface of the sheet 402 is originally covered with a bonded layer 410 of conductive material. The layer 410 is then partially removed, or etched away, leaving uncovered portions 412 of the sheet 402 bordering the outlines of, and thus insulating, the strips which are needed to supply the lines called for in the schematic diagram. Portions of the layer 410 which are left, though not used, need not be removed as they do not interfere with the proper operation of the system. The electromagnetic waves are impressed upon the system between the ground plate 400 and the end portion 414 of strip 404. The output indicative of the binary sum may be taken off between the ground plate and the end portion 416 of the strip 408. The output indicative of the carry digit may be taken off between the ground plate and the end portion 418 of the strip 406. The dummy load 420 comprises a resistive coating on the end portion of a strip 422.

Figure 10:
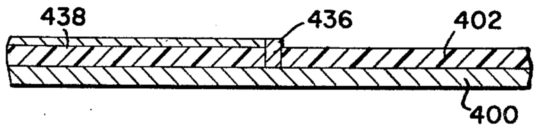
FIG. 10 is a sectional view of a short-circuit termination as applied to a strip line.

FIG. 9 is a cross-sectional view showing how a gas discharge tube may be inserted into the system of FIG. 4 to act as a switch. A slot 424 is provided through which the disks 302 and 306 of the tube will pass. The slot has a narrowed portion into which the tube may be slid where it is secured and in which the disk 302 makes contact with a ring-shaped strip 428. To accommodate the spacing between the disks 302 and 306, the ground plate may be built up by means of a ring of conductive material 430 attached to or integral with the ground plate. The disks make frictional contact with the conductive surfaces of the ring 428 and the ring 430. To improve the contact, in some embodiments the disks may be clamped to or soldered or brazed to the contacting surfaces. To serve the function of the resonant cavity surrounding the gas discharge tube in the system of FIG. 2, a stub line 440 is connected to the ring 428. In order to provide direct current isolation between the electrodes 304 and 308, narrow gaps 432, 434 are provided in the strip lines on either side of the ring 428. Where short-circuit termination of a strip line is desired, a hole may be drilled or etched through the sheet 402 at the end of the strip and filled with conductive material in contact both with the strip and with the ground plate. A ground connection of this sort is shown in cross-sectional view in FIG. 10, and in broken away view at 436 in FIG. 4.

FIG. 11 shows in schematic form a system for performing the logical operation defined by the following logical formula $$X=(AB)+(CD) \qquad (1)$$

As indicated in FIG. 11A, the system of FIG. 11 is controlled by signals received over four lines, 118, 120, 122, 124. Line 118 controls switches A and A′, line 120 controls switches B and B′, line 122 controls switches C and C′, and line 124 controls switches D and D′.

Output is transmitted to receiving device X if and only if signals are received at A and B both, or else at C and D both. The main transmission path extends from the source 20 over two parallel paths to the device X. Each of these paths is an "and" circuit of the same type as section (c) of the system of FIG. 1. Because these two "and" circuits are in parallel, transmission may be effected through either or both. Hence, the result is as called for in Formula 1 above.

The logical formula which is logically complementary with respect to Formula 1 is:

$$Y=(\overline{A}+\overline{B})(\overline{C}+\overline{D}) \qquad (2)$$

Formula 2 means that there is an output at Y if and only if signals are absent at A or at B or at both A and B, and at the same time signals are absent either at C or at D or at both C and D. The circuit between the source 20 and the receiving device or dummy load Y is designed to respond to the complementary logical function given by Formula 2, which means that whenever the device X is not connected to the source 20, the device Y will be connected to the source.

The circuit for performing the logical operation given by Formula 2 is comprised of two circuits, which will be designated as being of type (*e*), which are connected in serial or tandem relationship to each other between the source and the device Y. Type (*e*) circuit differs from the type (*b*) circuit shown in FIG. 1 only in the electrical distance between the ring and the switches. In type (*e*), the switches are spaced a half wavelength from the ring. The type (*e*) circuit is an "or" circuit, but it responds to the absence of a signal instead of the presence of a signal. The lower of the type (*e*) circuits in FIG. 11 responds to the absence of a signal at either A or B or both, and the upper type (*e*) circuit responds to the absence of a signal at either C or D or both. The placing of the two type (*e*) circuits in series provides the "and" function required by the Formula 2.

Figure 12:
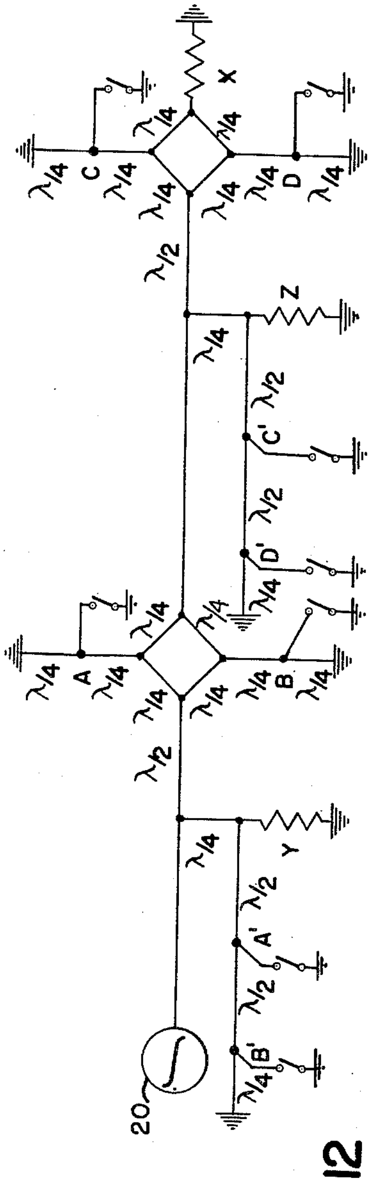
Figure 13:
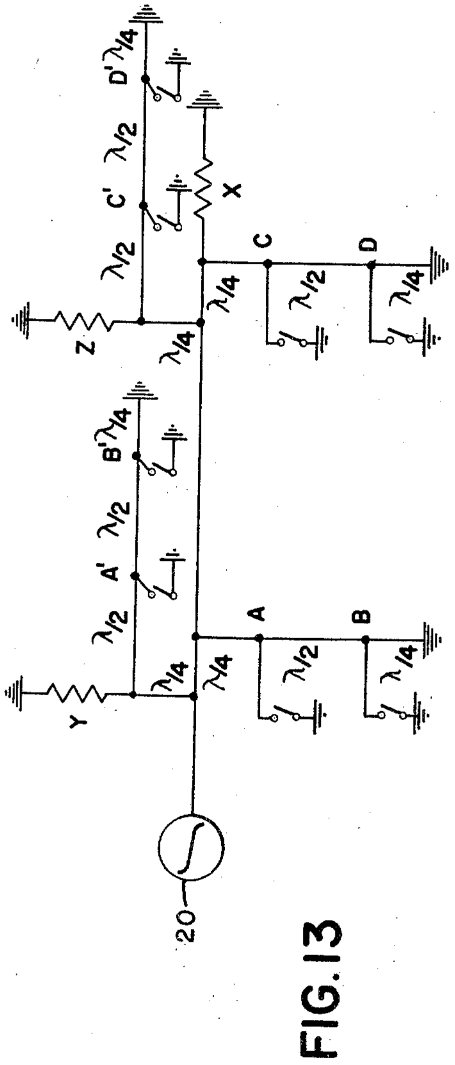

FIGS. 12 and 13 show two different systems both of which are arranged to perform the same identical logical operation, given by the formula $$X=(A+B)(C+D) \qquad (3)$$

Either system responds if and only if either A or B is present together with either C or D.

In the system of FIG. 12, two "or" circuits both of the type (*b*) shown in FIG. 1, are connected in serial relationship to each other between the source 20 and the device X. Two dummy loads, Y and Z, are provided. In parallel with the dummy load Y there is connected a circuit of the general type (*a*) of FIG. 1, to provide a transmission path from the source to the device Y if neither A nor B is present. In parallel with the dummy load Z there is connected another circuit of the general type (*a*), to provide a transmission path from the source to the device Z if A or B or both are present but neither C nor D is present.

In the system of FIG. 13, two "or" circuits of a type different from type (*b*) are employed. These will be designated type (*f*). They differ in internal structure and operation from type (*b*) but are connected in serial relationship to each other between the source and the device X just as are the circuits of type (*b*) in the system of FIG. 1. The dummy loads Y and Z are connected to the system of FIG. 13 in exactly the same manner as is shown in FIG. 12.

Figure 14:
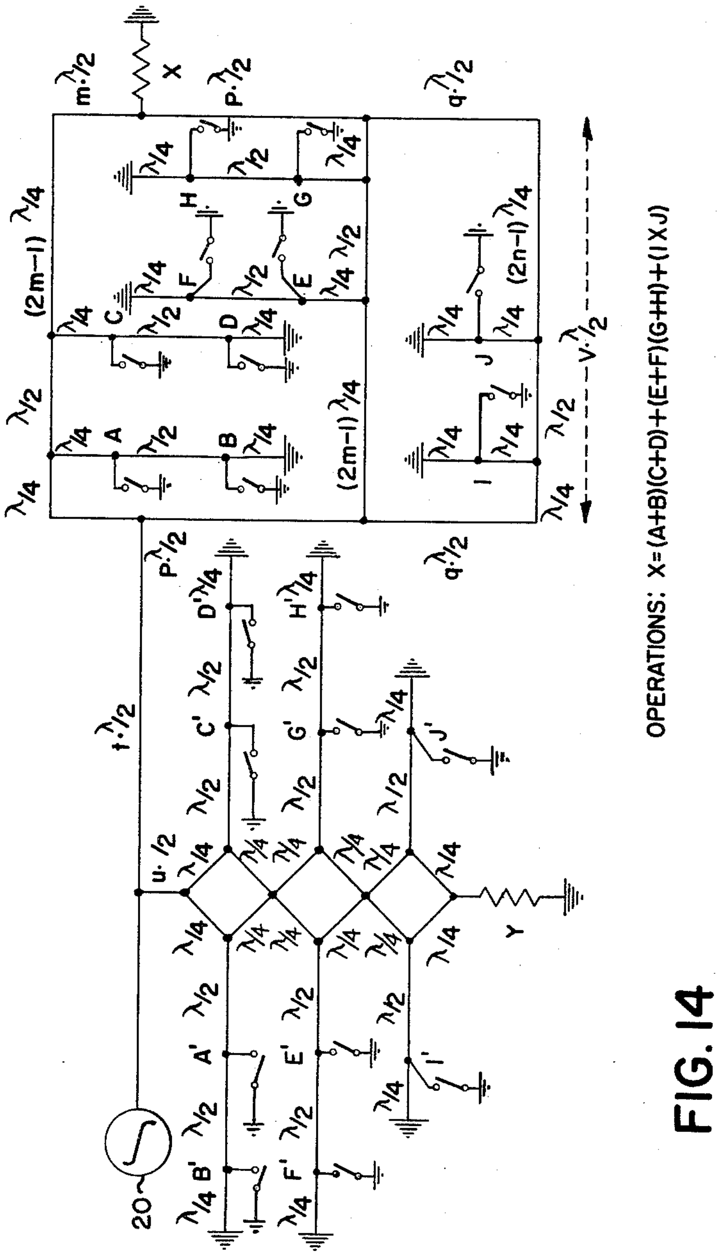
Figure 15:
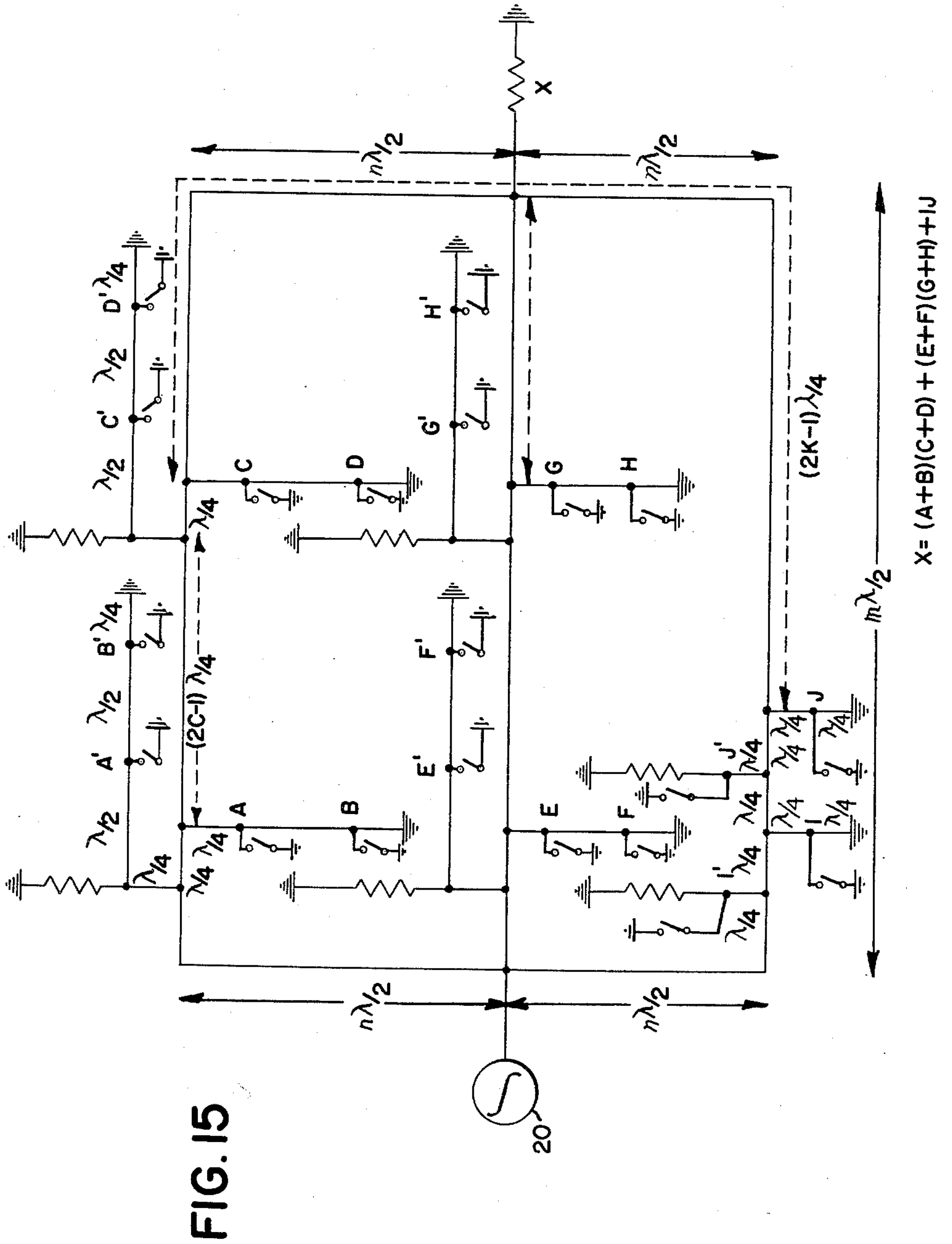

FIGS. 14 and 15 show examples of systems in which the number of control signals is considerably increased, there being ten controls shown. It will be obvious that the number of controls may be multiplied further using an extension of the same principles. The systems of FIGS. 14 and 15 represent two different ways of setting up a system for performing the identical logical operation. In this case the formula describing the operation is $$X=(A+B)(C+D)+(E+F)(G+H)+IJ \qquad (4)$$

which means that the system responds if and only if one or more of the following conditions are fulfilled. (1) Either A or B is present together with either C or D; (2) either E or F is present together with either G or H; or (3) I and J are present together. If none of these conditions is fulfilled, it is arranged that the source 20 will transmit into the dummy load Y.

In the system of FIG. 14, to provide for the triple alternative required by Formula 4, three parallel transmission paths are interposed between the source and the receiving device X. The upper one of these paths provides two serially connected circuits of type (*f*) under the control of signals from A, B, C and D. The middle path provides two serially connected circuits of type (*f*) under the control of signals from E, F, G and H. The lower path comprises a type (*c*) "and" circuit.

To provide for the complementary logical operation, three serial transmission paths are interposed between the source and the dummy load Y. The lowermost of these paths is a circuit of the type (*d*) shown in FIG. 1, which responds if and only if I and J are not present together. The uppermost of the three paths is similar to type (*d*) except that it responds if and only if it is not true that either A or B is present together with either C or D. The middle path responds if and only if it is not true that either E or F is present together with either G or H.

As in the system of FIG. 1, so in all the other embodiments it is necessary to adjust the intervals between junction points to provide either even or odd numbers of quarter wavelengths as the case may be so that the various branch circuits will not interfere with each other and so that the source 20 will in every case be permitted to work into a substantially matching impedance. In FIGS. 14 and 15, the letters *c, k, m, n, p, q, t* and *v* represent arbitrarily chosen integral numbers of quarter wavelengths or half wavelengths as the case may be.

In the system of FIG. 15, the three principal parallel paths interposed between the source 20 and the receiving device X are connected in equivalent manner to that shown in FIG. 14. The paths providing for the complementary logical operation are disposed differently from those shown in FIG. 14. In place of the group of serially connected paths shown in FIG. 14, there are provided two auxiliary paths associated with each of the principal parallel paths. The number of dummy loads is increased to six as compared to one shown in FIG. 14, but the total length of line required is somewhat reduced.

From the exemplary system shown herein it will be evident that systems may readily be designed to perform many other logical operations in any desired degree of complexity by applying the principles which are illustrated in the examples.

Figure 16:
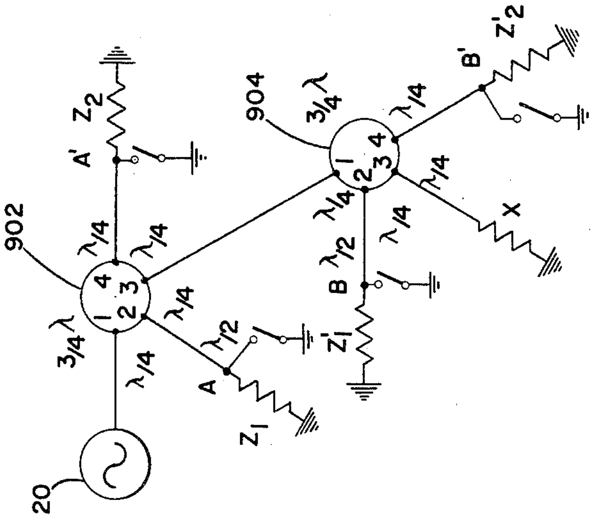
FIG. 16 is a schematic circuit diagram of an and-circuit employing a hybrid ring.

FIG. 16 shows in schematic form an and-circuit employing hybrid rings with switching devices in certain of the transmission arms attached to the rings. The hybrid rings are shown at 902 and 904 respectively. The rings may take various forms comprising coaxial line, strip line, waveguide or other forms. Branch lines are connected to the rings at junction points 1, 2, 3 and 4. In an embodiment known as a shunt coaxial hybrid ring, for example, the ring is a continuous loop of coaxial line with shunt lines connected thereto at the junction points. Assuming that $Z_0$ is the characteristic impedance of a branch line, the coaxial line in the ring should have a characteristic impedance of $\sqrt{2}\,Z_0$. The circumference of the loop is shown as one and one-half wavelengths divided one quarter wavelength between junction 1 and junction 2, one quarter wavelength between junction 2 and junction 3, one quarter wavelength between junction 3 and junction 4, and three quarters of a wavelength between junction 4 and junction 1.

The source 20 is connected to junction 1 of ring 902 through an arbitrary length of line. A dummy load $Z_1$ is connected to junction 2 of this ring through a branch line which has a switching device A across the line a half wavelength from the junction 2. The junction 3 of ring 902 is connected to junction 1 of ring 904 through an arbitrary length of line. A dummy load $Z_2$ is connected to junction 4 of ring 902 through a branch line which has a switching device A′ across the line a quarter wavelength from the junction 4.

In ring 904, a dummy load $Z'_1$ is connected to junction 2 through a branch line which has a switching device B across the line a half wavelength from the junction 2. A receiving device X is connected to the junction 3 through an arbitrary length of line. A dummy load $Z'_2$ is connected to junction 4 through a branch line which has a switching device B′ across the line a quarter of a wavelength from the junction 4.

In the operation of the system of FIG. 16 as an and-circuit, the switches A and A′ are operable together to produce short-circuit conditions across the line at their respective locations when a signal A is present, and the switches B and B′ are operable together to produce short-circuit conditions across the line at their respective locations when a signal B is present.

Assuming that the dummy loads are matched to their respective lines no reflected waves are present at junctions 2 and 4 of either ring when all the switches are open. In this case, waves from the source 20 reaching junction 1 divide and travel in opposite directions around the ring. The distance in the clockwise direction from junction 1 to junction 3 differs by half a wavelength from the distance in the counterclockwise direction from junction 1 to junction 3. Accordingly, no energy is transmitted from junction 1 to junction 3 and the dummy loads connected to junctions 2 and 4 serve as parallel loads for the generator 20.

In case switches A and A′ are closed, the closure of switch A provides a short-circuit condition at junction 2, while the closure of switch A′ produces an open-circuit condition at junction 4, thereby permitting energy from the source 20 to go into the line connecting junction 3 of ring 902 with junction 1 of ring 904.

If switches B and B′ are open, the energy received at junction 1 of ring 904 goes to the dummy loads $Z'_1$ and $Z'_2$ and no energy goes to the receiving device X. The dummy loads provide the proper load for the source.

If all the switches are closed, the energy received at junction 1 of ring 904 is permitted to go to junction 3 and thence to the receiving device X, thereby indicating that signals are present on both A and B.

It will be noted that the single ring 902 may be used alone to indicate, in loads $Z_1$ or $Z_2$ the absence or inverse of A, and at terminal 3, the presence of A, thereby performing simple logical operations involving only a single item of information.

Figure 17:
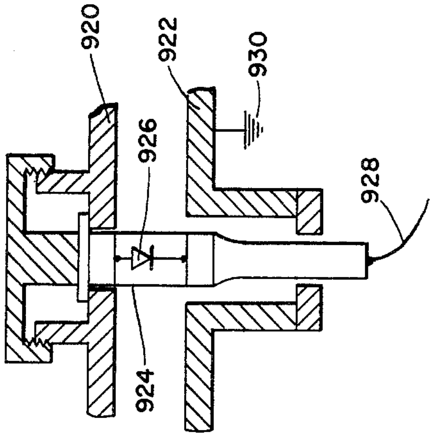
FIG. 17 shows a diode mounted in a waveguide with coaxial line means for activating the diode.

FIG. 17 shows in sectional view a diode, such as a semiconductor diode, mounted in a waveguide. Upper and lower walls, 920 and 922, respectively, are indicated. A wave-permeable holder 924 is shown mounted across the waveguide from top to botom. Conventional means are shown for securing the holder in place. A diode 926 is indicated schematically as being connected between the body of the waveguide and a lead wire 928 for connection to a signal source such as wire 118 or 120 of FIG. 1A. The waveguide structure may be grounded as at 930.

In all embodiments, it will usually be preferable to use the convention that an input signal which represents an input of a binary digit "one" shall cause a switch to be turned on, i.e., cause the switch to produce a short-circuit condition across the transmission line at the location of the switch. In this case, if it is desired that the input of a digit "one" shall produce a short-circuit condition at a given point in the system, the switch may be placed directly at the point in question. Alternatively, the switch may be placed in a stub line. If, on the other hand, it is desired that the input of a digit "one" shall produce an open-circuit condition at a point in question, then the switch may be placed in a stub line, for example, in a line an even number of quarter wavelengths long and short-circuited at the remote end, connected to the main line at the point in question, and the switch may be located an odd number of quarter wavelengths from the point where the stub line joins the main line, so that when the switch is turned off, a short-circuit condition will be produced at this point.

The opposite convention may of course be used, that an input of a binary digit "one" will cause a switch to be turned off. In this case, if it is desired that an input of a digit "one" shall produce a short-circuit condition at a given point in the system, the switch may be placed in a stub line which is of a length of an integral number of half wavelengths and short-circuited at the remote end, and connected to the main line at the given point, and the switch may be located an odd number of quarter wavelengths away from the point where the stub line joins the main line. If on the other hand it is desired that the input of a digit "one" shall, under this convention, produce an open-circuit condition at the point in question, then the switch may be placed in a stub line which is an odd number of quarter wavelengths long and short-circuited at the remote end, and the switch may be located an even number of quarter wavelengths from the point where the stub line joins the main line. Other equivalent switching arrangements may readily be devised.

It will be noted that in general it is desirable to provide that the source of the electromagnetic waves shall at all times work into a substantially matched impedance and particularly that the impedance facing the source shall not be subjected to any sudden fluctuations, such as might be produced as a result of switching. Accordingly, it is an object of the invention to arrange the system in such a way that the circuit branches in which switches are located shall produce either a short-circuit condition or a substantially open-circuit condition at the point where the circuit branch or stub line joins the main line, so that a branch circuit that is temporarily not in use will substantially stop transmission or will not materially interfere with transmission, as the case may require.

While a gas discharge tube has been shown as the switching device in several of the illustrative embodiments of the invention, it will be understood that other switching devices may be used, for example, a semiconductor diode. Such a diode will not require a keep-alive potential. Otherwise it will function similarly to a gas discharge tube in providing either a substantially open-circuit condition in a line across which it is connected, or a substantially short-circuit condition across the line at the point of application.

It will be understood that the change of state of a gas discharge tube or of a semiconductor diode as a switching device may be effected either by the application of an alternating current or of a direct current. In the case of excitation of the switching device by alternating current, the control frequency may be the same as, or different from, the frequency of the waves provided as by the source 20.

While stub transmission lines have been shown in the drawings as short-circuited at the end remote from the junction of the stub line with the main line, in order to reflect waves, it will be evident that an open-circuit termination may be used instead. A switch may be placed at the normally open end of the stub line in order that a short-circuit condition may be imposed upon the line at that point when the switch is closed. Alternatively, a switch may be placed a quarter wavelength or a half wavelength away from the open end or from the junction point of the main line and the stub, to impose a short-circuit condition upon the stub line where normally no short-circuit condition would exist. It will be evident that the various switching results shown where stub lines with short-circuit termination are employed may be obtained using stub lines with open-circuit termination. It will be noted that a short-circuit termination results in a phase reversal in the reflected wave as compared to the incident wave, whereas an open-circuit termination reflects a wave without a phase reversal.

While coaxial line embodiments and strip line embodiments of systems according to the invention have been illustrated in detail in addition to a showing of the corresponding single-line schematic diagrams, it will be evident from the present description, that waveguide embodiments may be built in accordance with any of the system schematic diagrams by using waveguide segments of the lengths shown in the diagrams and connecting them together as indicated in the schematic diagram. It is therefore considered unnecessary to show waveguide embodiments in more detail. The switching device and dummy load devices which have been referred to may be inserted at the proper points in a waveguide system, where called for in the schematic diagram. FIG. 9 shows a switch of the gas discharge type mounted in a hollow resonator of the waveguide type. FIG. 17 shows a diode mounted in a waveguide and shows a lead wire connected to the diode to transmit a switching signal to the diode.

Other forms of transmission line may also be used, for example, a pair of wires insulatingly supported within a conductive sheath.

It will be evident that, in general, line segments differing in effective electrical length by an integral number of half wavelengths at the frequency of the source 20 are equivalent for purposes of the invention. For example, instead of a line of one-quarter wavelength, a line of three-quarters wavelength may be employed.

Also, in some cases, where a transmission line of a certain length between two points is called for in systems of the type described above, it will be understood that if additional impedance means should be added between those points, the actual physical length of the line between those points may be adjusted so as to produce an electrical length which is equivalent to that called for.

While illustrative forms of apparatus in accordance with the invention have been described and shown herein, it will be understood that numerous changes may be made without departing from the general principles and scope of the invention.

What is claimed is:

1. In a binary half adder, in combination, a source of electromagnetic waves, first, second and third receiving devices, said receiving devices each being substantially matched in impedance with said source, a network of main transmission lines for said waves, said lines interconnecting said source and said receiving devices, a plurality of switching devices located at various points in said network spaced apart by intervals of integral numbers of quarter wavelengths at the frequency of alternation of said waves, and means to control each of said switching devices in accordance with the value of one of a pair of binary digits to be added, whereby said switching devices by virtue of their respective positions in said network jointly control transmission of said waves from said source to a particular one of said receiving devices, to distinguish by means of a wave transmitted to said first receiving device when the said digits are unequal in value by means of a wave transmitted to said second receiving device when the said digits are both ones, or by means of a wave transmitted to said third receiving device when the said digits are both zeros, the source thereby at all times facing a substantially matched impedance.

2. In a logic system, in combination, a main transmission line for electromagnetic waves, a stub transmisison line connected to said main line for the purpose of performing a switching function effective at the junction of the said main and stub lines, said stub line having an electrical length equivalent to an odd number of quarter wavelengths at the frequency of alternation of said waves, said number of quarter wavelengths being at least five, said stub line being terminated in a short circuit at the end remote from the junction of said main and stub lines, and a plurality of line-short-circuiting switching means in said stub line, said last-mentioned means being spaced from said junction and from each other by distances each of which is electrically equivalent to an even number of quarter wavelengths, and independent means for actuating each said line-short-circuiting switching means, whereby said main line is effectively short-circuited at said junction whenever at least one of said line-short-circuiting switching means is actuated.

3. In a logic system, in combination, a main transmission line for electromagnetic waves, a stub transmission line connected to said main line for the purpose of performing a switching function effective at the junction of the said main and stub lines, said stub line having an electrical length equivalent to an even number of quarter wavelengths at the frequency of alternation of said waves, said number of quarter wavelengths being at least four, said stub line being terminated in a short circuit at the end remote from the junction of said main and stub lines, and a plurality of line-short-circuiting switching means in said stub line, said last-mentioned means being spaced from said junction by distances each of which is electrically equivalent to an odd number of quarter wavelengths, and independent means for actuating each said line-short-circuiting switching means, whereby said main line is unaffected by actuation of one or more of said line-short-circuiting switching means and is effectively short-circuited whenever none of said line-short-circuiting switching means is actuated.

4. In a binary half adder, in combination, a main transmission network connecting a source of electromagnetic waves to a first receiving device for indicating a sum digit, a second receiving device for indicating a carry digit, a dummy load device, a first branch circuit connected to said main network for diverting energy from said source to said dummy load if and only if two binary zeros are to be added, a first pair of parallel transmission paths included in said main network for transmitting energy if and only if either or both of the binary digits to be added are ones, a second branch circuit connected to said main network between said parallel transmission paths and said first receiving device for diverting energy from said main network to said second receiving device if and only if two binary ones are to be added, a second pair of parallel transmission paths included in said main network and connected directly to said first receiving device for transmitting energy if and only if a binary one and a binary zero are to be added, a source of signals representing binary digits to be added, and means controlled by said signal source for varying the impedance at a plurality of points in said transmission system spaced apart from each other by an integral number of quarter wave lengths for the waves from said electromagnetic wave source, whereby said impedance varying means controls the transmission of waves between said electromagnetic wave source and said receiving devices in accordance with the result of the addition of said binary digits.

5. In a half adder for adding a binary digit A and a binary digit B, in combination, a source of electro-magnetic waves, a first receiving device for indicating a sum digit, a second receiving device for indicating a carry digit, a dummy load device to serve as a third receiving device, said first and second receiving devices and said dummy load device having substantially equivalent impedance characteristics for waves from said source, a first circuit connecting said source to said dummy load device, a plurality of switching means jointly controlled by signals representative of the values of said digits A and B respectively, first transmission line means included between said source and said dummy load device under the control of a first said switching means for connecting said source to said dummy load device if and only if said digits A and B are both zeros, second transmission line means included between said source and said first receiving device under the control of a second said switching means for connecting said source to said first receiving device if and only if said digits A and B are unequal digits, and a third transmission line means included between said source and said second receiving device for connecting said source to said second receiving device if and only if said digits A and B are both ones, said switching means operating to vary the impedance at a plurality of points in said transmission system spaced apart from each other by an integral number of quarter wave lengths for the waves from said electro-magnetic wave source.

6. A half adder, comprising a source of electro-magnetic waves, a main transmission line for said waves connecting said source to a first receiving device for indicating a sum in an adding operation, first and second transmission rings serially inserted in said main transmission line, a first stub line connected to said main transmission line at a point intermediate between said wave source and the first said transmission ring, second and third stub lines connected to opposite sides of said first transmission ring, a fourth stub line connected to said main transmission line at a point intermediate between said first and second transmission rings, fifth and sixth stub lines connected to opposite sides of said second transmission ring, an impedance matching dummy load device terminating said first stub line at the end thereof remote from its connection to the said main line, a second receiving device for indicating a carry digit in said adding operation terminating said fourth stub line at the end thereof remote from its connection to the said main line, first and second auxiliary stub lines connected to said fourth stub line, switching devices A and B respectively connected across said second and third stub lines one quarter wave length away from said first transmission ring, switching devices A′ and B′ respectively connected across said fifth and sixth stub lines one half wave length away from said second transmission ring, a switching device A″ connected across said first stub line one quarter wave length away from said main line, a switching device B″ connected across said first stub line three quarters of a wave length away from said main line, switching devices A‴ and B‴ respectively connected across said first and second auxiliary stub lines one quarter wave length away from the connection of the fourth stub line and the respective auxiliary stub line, said first auxiliary stub line being connected to the fourth stub line at a point one quarter of a wave length away from the junction of said main transmission line and the fourth stub line, and said second auxiliary stub line being connected to the fourth stub line at a point three fourths of a wave length away from the junction of said main transmission line and the fourth stub line, a plurality of quarter wave length short-circuited terminations individual to the switching devices A, B, A′, B′, A‴ and B‴ respectively, common control means for switching devices A, A′, A″ and A‴ and common control means for switching devices B, B′, B″ and B‴.

7. In a half adder, in combination, a source of electro-magnetic waves, a main transmission path connecting said source to a first receiving device for indicating a sum in an adding operation, said main path comprising a first half wave length section of transmission line followed by two parallel transmission lines each consisting of two quarter wave length section connected in tandem with each other at first and second junction points, respectively, said parallel transmission lines being followed in tandem first by a second half wave length section of transmission line and then by two additional parallel transmission lines each consisting of two quarter wave length sections connected in tandem with each other at third and fourth junction points, respectively, a first stub line connected to said main line at the end of the said first half wave length section nearest the said source, said first stub line being three quarters of a wave length long and terminated in an impedance matching dummy load device, switching means A″ connected across said first stub line one quarter wave length away from said main line, switching means B″ connected across said first stub line three quarters of a wave length away from said main line, a second stub line one half wave length long connected to said first junction point, a switching device A connected across said second stub line at the mid-point thereof, a third stub line one half wave length long connected to said second junction point, a switching device B connected across said third stub line at the mid-point thereof, a fourth stub line connected to said main line at the end of the said second half wave length line section nearest the said source, said fourth stub line being three quarters of a wave length long and terminated in a second receiving device for indicating a carry digit in said adding operation, a half wave length first auxiliary stub line connected across said fourth stub line one quarter wave length away from said main line and having a switching device A‴ connected across its mid-point, a half wave length second auxiliary stub line connected across said fourth stub line three quarters of a wave length away from said main line and having a switching device B‴ connected across its mid-point, a fifth stub line three quarters of a wave length long connected to said third junction point and having a switching device A′ connected thereacross at a point one half wave length from said third junction point, and a sixth stub line three quarters of a wave length long connected to said fourth junction point and having a switching device B′ connected thereacross at a point one half wave length from said fourth junction point, short circuited terminations at the remote ends of the second, third, fifth and sixth stub lines and of the said auxiliary stub lines, first control means common to switching devices A, A′, A″ and A‴ and second control means common to switching devices B, B′, B″ and B‴.

8. In an "and" circuit, in combination, first and second hybrid rings each having junction points 1, 2, 3 and 4, a source of waves connected to the junction point 1 of a first of said rings, individual switching means, adapted to be actuated by a signal A, connected to junction points 2 and 4 respectively of said first ring for controlling transmission of said waves from junction 1 to junction 3 in response to the presence of a signal A, a direct connection from junction 3 of said first ring to junction 1 of said second ring, individual switching means, adapted to be actuated by a signal B, connected to junctions 2 and 4 respectively of said second ring for controlling transmission from junction 1 to junction 3 of said second ring in response to the presence of a signal B, and a receiving device for said waves connected to junction 3 of said second ring for indicating the simultaneous presence of signals A and B, said switching means operating to vary the impedance at a plurality of points in said circuit spaced apart from each other by an integral number of quarter wave lengths for the waves from said source of waves.

9. In an "and" circuit, in combination, first and second hybrid rings each having junction points 1, 2, 3 and 4, a source of waves connected to the junction point 1 of a first of said rings, first, second, third and fourth wave transmission paths each including switching means, said paths being connected respectively to junction points 2 and 4 of said first ring and junction points 2 and 4 of said second ring, the switching means in said first and second paths being adapted to be actuated simultaneously by a signal A, for controlling transmission of said waves from junction 1 to junction 3 of said first ring in response to the presence of a signal A, a direct connection from junction 3 of said first ring to junction 1 of said second ring, the switching means in said third and fourth paths being adapted to be actuated simultaneously by a signal B, for controlling transmission of said waves from junction 1 to junction 3 of said second ring in response to the presence of a signal B, the switching means in said first and third paths being spaced from junction 2 of their respective rings by an even number of quarter wavelengths for said waves, the switching means in said second and fourth paths being spaced from junction 4 of their respective rings by an odd number of quarter wavelengths for said waves, and a receiving device for said waves connected to junction 3 of said second ring for indicating the simultaneous presence of signals A and B, said switching means operating to vary the impedance at a plurality of points in said circuit spaced apart from each other by an integral number of quarter wave lengths for the waves from said source.

10. In a binary half adder, in combination, a source of electromagnetic waves, a first receiving device for indicating a sum in an adding operation, a second receiving device for indicating a carry digit in said adding operation, a third receiving device for use when neither said first receiving device nor said second receiving device is in use, a network of transmission lines interconnecting said source and said receiving devices, individual means for varying the impedance at each of a plurality of points in said transmission line network spaced apart from each other by an integral number of quarter wave lengths for the waves from said electromagnetic wave source, and means to control certain of said impedance varying means in accordance with the value of a first binary digit to be added, and means to control the remainder of said impedance varying means in accordance with a second binary digit to be added, said control means being effective in such manner as to control the impedance at each said point whereby transmission of said waves is controlled from said source to a particular one of said receiving devices, to indicate by means of a wave transmitted to said first receiving device a binary sum of one, with zero carry, by means of a wave transmitted to said second receiving device a binary carry of one and a binary sum of zero, or by means of a wave transmitted to said third receiving device a binary sum of zero with zero carry.

11. In a logic system, in combination, a source of electromagnetic waves, first and second receiving devices, a plurality of parallel transmission paths for said waves extending between said source and said first receiving device, a transmission path for said waves extending between said source and said second receiving device, a plurality of sources of signals representing respective items of information upon which a given logical operation is to be performed, and means controlled severally by said signal sources for varying the impedance at a plurality of points in each of said transmission paths, said points being spaced apart from each other by an integral number of quarter wave lengths for the waves from said electromagnetic wave source, whereby said impedance varying means jointly control the transmission of waves from said electromagnetic wave source to one or the other of said receiving devices to the exclusion of the other said receiving device in accordance with the result of the given logical operation.

12. In a logic system, in combination, a source of electromagnetic waves, a plurality of receiving devices, a plurality of parallel transmission paths for waves from said source, said paths extending between said source and a first of said receiving devices, a plurality of branch transmission paths associated with each said parallel transmission path, a plurality of sources of signals representing respective items of information upon which a logical operation is to be performed, and means controlled severally by said signal sources for varying the impedance at a plurality of points in said transmission paths, said points being spaced apart from each other by an integral number of quarter wave lengths for the waves from said electromagnetic wave source, whereby said impedance varying means controls the transmission of waves from said electromagnetic wave source either to said first receiving device or to one or another of a group of said receiving devices exclusive of said first receiving device.

13. In a logic system, in combination, a source of electromagnetic waves, a receiving device, a transmission network coupling said source to said receiving device, a plurality of sources of signals containing information upon which a given logical operation is to be performed, and means controlled severally by said signal sources for varying the impedance at a plurality of points in said transmission network spaced apart from each other by an integral number of quarter wave lengths for the waves from said electromagnetic wave source, said transmission network including at least two parallel paths, each of said paths having sections of an integral number of quarter wave lengths for the waves from the electromagnetic wave source, said sections each being defined by at least one pair of said plurality of spaced points.

14. In a logic system, in combination, a source of electromagnetic waves, first and second receiving devices for said waves, a transmission network interconnecting said source and said receiving devices, said network including a plurality of parallel transmission paths connecting said source to said first receiving device and a path connecting said source to said second receiving device, a plurality of sources of signals representing information upon which a given logical operation is to be performed, and means controlled severally by said signal sources for varying the impedance at a plurality of points in said transmission network spaced apart from each other by an integral number of quarter wave lengths for the waves from said electromagnetic wave source, whereby waves from said electromagnetic wave source are directed either to the first or the second said receiving device depending upon the result of said given logical operation.

15. In a logic system, in combination, a source of electromagnetic waves, first and second receiving devices for said waves, a transmission network interconnecting said source and said receiving devices, said network including a plurality of parallel transmission paths connecting said source to said first receiving device and a path connecting said source to said second receiving device, a plurality of sources of signals representing information upon which a given logical operation is to be performed, and means controlled severally by said signal sources for varying the impedance at a plurality of points in said transmission network spaced apart from each other by an integral number of quarter wave lengths for the waves from said electromagnetic wave source, each of said aforementioned transmission paths having a plurality of stub lines connected thereto, each of said stub lines having a section thereof comprising an integral number of quarter lengths for the waves from the electromagnetic wave source, each said section being defined by at least one pair of said plurality of spaced points, said plurality of spaced points being so disposed as to control transmission of waves either to the first or the second receiving device depending upon the result of said given logical operation.

16. In a logic system, in combination, a source of electromagnetic waves, a plurality of receiving devices for said waves, a transmission network interconnecting said source and said receiving devices, said network including a plurality of parallel transmission paths connecting said source to a first said receiving device, each said parallel transmission path also connecting said source to one or more of said receiving devices exclusive of said first said receiving device, a plurality of sources of signals representing information upon which a given logical operation is to be performed, and means controlled severally by said signal sources for varying the impedance at a plurality of points in said transmission network spaced apart from each other by an integral number of quarter wave lengths for the waves from said electromagnetic wave source, whereby transmission of electromagnetic waves is directed either to said first receiving device or to one or another of said receiving devices exclusive of said first receiving device depending upon the result of said given logical operation.

17. In a logic system, in combination, a source of electromagnetic waves, a plurality of receiving devices for said waves, a transmission network interconnecting said source and said receiving devices, said network including a plurality of parallel transmission paths connecting said source to a first of said receiving devices, each said transmission path having a plurality of stub lines, at least one stub line in each said parallel path connecting a point in the respective parallel path to a different one of said receiving devices in the group of said receiving devices exclusive of said first receiving device, a plurality of sources of signals representing information upon which a given logical operation is to be performed, and means controlled severally by said signal sources for varying the impedance at a plurality of points in said transmission network spaced apart from each other by an integral number of quarter wave lengths for the waves from said electromagnetic wave source, each said stub line having a section thereof comprising an integral number of quarter wave lengths for the waves from the electromagnetic wave source, each said section being defined by at least one pair of said plurality of spaced points, said plurality of spaced points being so disposed as to control transmission of waves either to the said first receiving device or to one or another of the group of receiving devices exclusive of said first receiving device depending upon the result of said given logical operation.

References Cited in the file of this patent

UNITED STATES PATENTS

| | | |
|---|---|---|
| 2,531,447 | Lewis | Nov. 28, 1950 |
| 2,580,389 | Anderson | Jan. 1, 1952 |
| 2,644,926 | Varela | July 7, 1953 |
| 2,914,249 | Goodall | Nov. 24, 1959 |
| 2,914,671 | De Lange | Nov. 24, 1959 |
| 2,917,711 | Griffith | Dec. 15, 1959 |
| 2,938,178 | Babakian | May 24, 1960 |
| 2,977,484 | Sterzer et al. | Mar. 28, 1961 |

OTHER REFERENCES

The Design of Switching Circuits, by Keister et al., Van Nostrand, 1959 (seventh printing), page 308.